United States Patent
Ryu et al.

(10) Patent No.: US 9,228,826 B2
(45) Date of Patent: Jan. 5, 2016

(54) APPARATUS AND METHOD FOR CONTACTLESS THICKNESS MEASUREMENT

(71) Applicant: Electronics and Telecommunications Research Institute, Daejeon (KR)

(72) Inventors: Han-Cheol Ryu, Daejeon (KR); Namje Kim, Daejeon (KR); Sang-Pil Han, Daejeon (KR); Kyung Hyun Park, Daejeon (KR); Hyunsung Ko, Seoul (KR); Jeong Woo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 103 days.

(21) Appl. No.: 13/802,198

(22) Filed: Mar. 13, 2013

(65) Prior Publication Data

US 2014/0061475 A1 Mar. 6, 2014

(30) Foreign Application Priority Data

Aug. 29, 2012 (KR) .................. 10-2012-0095272
Sep. 28, 2012 (KR) .................. 10-2012-0109025

(51) Int. Cl.
*G01B 11/06* (2006.01)

(52) U.S. Cl.
CPC .................... *G01B 11/06* (2013.01)

(58) Field of Classification Search
CPC ....................................... G01B 11/06
USPC ....................................... 250/341.1
See application file for complete search history.

(56) References Cited

U.S. PATENT DOCUMENTS

| | | | |
|---|---|---|---|
| 8,003,947 B1* | 8/2011 | Majewski et al. | 250/360.1 |
| 2004/0065831 A1* | 4/2004 | Federici et al. | 250/341.1 |
| 2004/0155665 A1* | 8/2004 | Arnone et al. | 324/644 |
| 2011/0133090 A1* | 6/2011 | Demers et al. | 250/339.07 |
| 2012/0044479 A1 | 2/2012 | Roulston et al. | |

FOREIGN PATENT DOCUMENTS

JP 2010-156664 A 7/2010
KR 10-2011-0050812 5/2011

OTHER PUBLICATIONS

Kim Nam Jae et al., "Terahertz Technologies Based on Photonic Devices", Electronics and Telecommunications Trends, Jun. 2011, pp. 71-87, vol. 26 Issue.3, Electronics and Telecommunications Research Institute.

G. Mouret, et al., "THz media characterization by means of coherent homodyne detection, results and potential applications", Applied Physics B, Lasers and Optics, 2007, pp. 395-399, vol. 89, Springer-Verlag.

* cited by examiner

*Primary Examiner* — David Porta
*Assistant Examiner* — Mindy Vu

(57) ABSTRACT

A contactless thickness measuring apparatus is provided which includes an terahertz transmitter configured to receive the first optical path signal from the coupler and to generate a terahertz continuous wave using the first optical signal and an applied bias; an optical delay line configured to delay the second optical path signal output from the coupler; and an terahertz receiver configured to receive the terahertz continuous wave penetrating a sample and to detect an optical current using the terahertz continuous wave and the second optical path signal delayed. A thickness of the sample is a value corresponding to the optical current which phase value becomes a constant regardless of a plurality of measurement frequencies.

16 Claims, 16 Drawing Sheets

APPARATUS AND METHOD FOR CONTACTLESS THICKNESS MEASUREMENT

CROSS-REFERENCE TO RELATED APPLICATIONS

A claim for priority under 35 U.S.C. §119 is made to Korean Patent Application Nos. 10-2012-0109025 filed Sep. 28, 2012, and 10-2012-0095272 filed Aug. 29, 2012, in the Korean Intellectual Property Office, the entire contents of which are hereby incorporated by reference.

BACKGROUND

The inventive concepts described herein relate to a contactless thickness measuring apparatus and a thickness measuring method thereof.

A frequency (e.g., 0.1 to 10.0 THz) of a terahertz wave may correspond to a frequency domain of vibration and rotation among molecules of an organic/nonorganic material. In particular, the frequency may be associated with information of a living body material including moisture. In a terahertz spectroscopy, application to medical diagnosis, biotechnology material, etc. may be researched by using a characteristic not analyzed by another spectrum technique. In general, a terahertz wave may be generated using a pulse wave or a continuous wave.

A terahertz time-domain spectroscopy may use a pulse wave to analyze a material. Since signal amplitude and phase are simultaneously analyzed, it is possible to calculate a thickness or permittivity of a material. However, since a terahertz pulse-type spectrum system uses a high-priced femtosecond laser, its size may be large and high-priced. A terahertz frequency-domain spectroscopy developed to overcome the above-described drawback may use a terahertz continuous wave to analyze a material. Thus, in comparison with a pulse type spectroscopy, it is possible to implement a small-sized and low-priced system.

Since a terahertz continuous wave spectrum system generates and detects a terahertz wave using a beating light source of a laser having two different wavelengths, a terahertz wave generated may be decided by a beating frequency of the laser. A general terahertz continuous wave spectrum system may measure a thickness of a material in a homodyne manner by controlling a frequency of a terahertz continuous wave precisely. To achieve this, it is essential to perform precise control and measurement on a laser wavelength by which a terahertz continuous wave frequency is decided.

SUMMARY

One aspect of embodiments of the inventive concept is directed to provide a contactless thickness measuring apparatus which comprises a laser generating element configured to generate a first laser light having a first frequency and a second laser light having a second frequency different from the first frequency; a coupler configured to couple the first and second laser lights to output a first and second optical path signals; an terahertz transmitter configured to receive the first optical signal from the coupler and to generate a terahertz continuous wave using the first optical path signal and an applied bias; an optical delay line configured to delay the second optical path signal output from the coupler; and an terahertz receiver configured to receive the terahertz continuous wave penetrating a sample and to detect an optical current using the terahertz continuous wave and the second optical signal delayed, wherein a thickness of the sample is a value corresponding to the optical current, wherein the first and second optical path signals are 50% of the first and second laser lights coupled by the optical coupler, respectively.

Another aspect of embodiments of the inventive concept is directed to provide a thickness measuring method of a contactless thickness measuring apparatus, comprising coupling beating signals having different frequencies; generating a terahertz continuous wave using the coupled beating signal and an applied bias; applying the terahertz continuous wave to at least one sample; receiving a terahertz continuous wave passing through the at least one sample; detecting an optical current by a homodyne manner using the received terahertz continuous wave; and controlling an optical delay line such that a phase value of the detected optical current becomes a constant regardless of a plurality of measurement frequencies.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
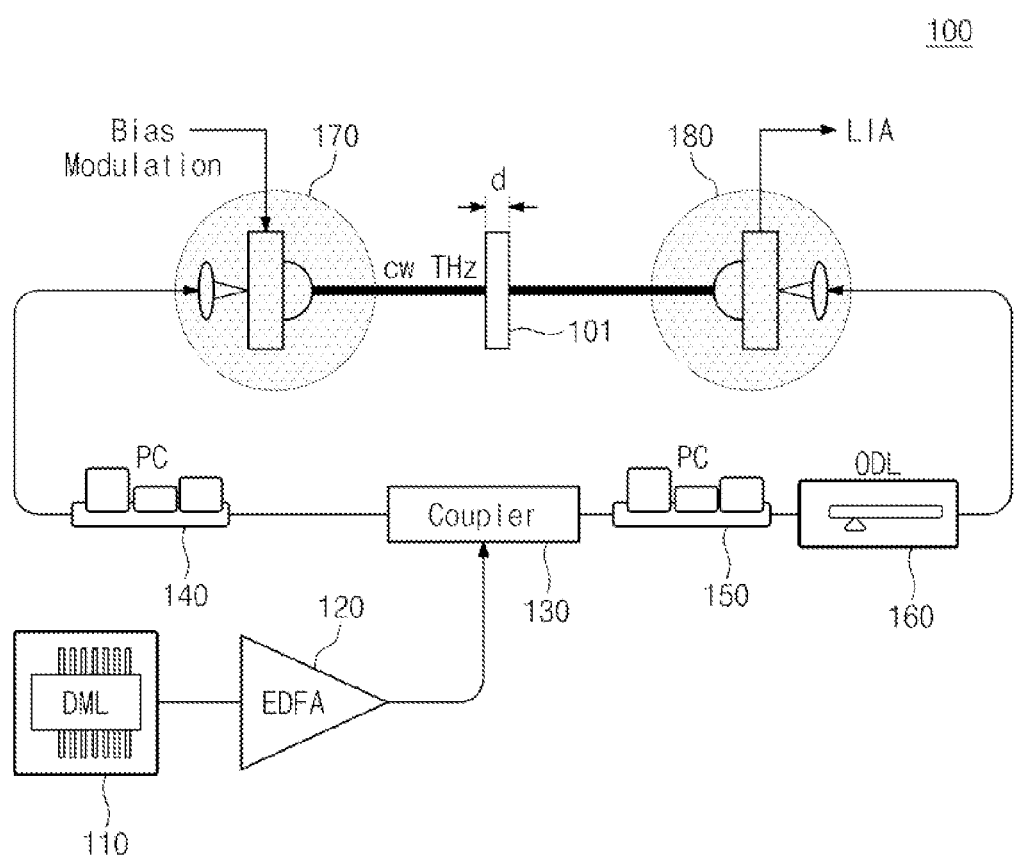
FIG. 1 is a block diagram schematically illustrating a contactless thickness measuring apparatus according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A contactless thickness measuring apparatus according to the inventive concept may use a terahertz continuous wave system, and may be implemented simply and for low price without precise control and measurement of two laser wavelengths (or, frequencies). In particular, the contactless thickness measuring apparatus according to the inventive concept may use a laser outputting optical signals (or, beating signals) having different wavelengths and an optical mixer (or, a photo-mixer (or photomixer)), so that a terahertz continuous wave system is implemented by a homodyne manner. Herein, the photo-mixer (or photomixer) may generate a current corresponding to a frequency difference when different optical signals having the same polarization and different frequencies are received, and may radiate an electromagnetic wave (or, a terahertz wave) corresponding to the current through an antenna.

FIG. 1 is a block diagram schematically illustrating a contactless thickness measuring apparatus according to an embodiment of the inventive concept. Referring to FIG. 1, a contactless thickness measuring apparatus 100 may be a terahertz continuous wave homodyne system, and may include a dual mode laser (DML) 110, an optical amplifier 120, a coupler 130, a first polarization controller (PC) 140, a second polarization controller 150, an optical delay line (ODL) 160, an terahertz transmitter 170, and an terahertz receiver 180. In particular, the inventive concept may be implemented to adjust a length of an optical line at a receiving stage by installing the optical delay line 160 on the optical line at the receiving stage.

The dual mode laser 110 may generate two optical signals having different frequencies. In FIG. 1, there may be illustrated the dual mode laser 110 which generates two optical signals having different frequencies. However, the inventive concept is not limited thereto. The inventive concept can be implemented to include two lasers respectively generating two optical signals having different frequencies.

The optical amplifier 120 may amplify two optical signals having different frequencies provided from the dual mode laser 110. In example embodiments, the optical amplifier 120 may be formed of an erbium-doped fiber amplifier (EDFA).

The coupler 130 may receive the optical signals having different frequencies from the optical amplifier 120 for 3 dB coupling. The optical signals coupled may be provided to the first and second polarization controllers 140 and 150. Below, optical signals provided to the first polarization controller 140 may be referred to as a first optical path signal and an optical signal provided to the second polarization controller 150 may be referred to as a second optical path signal. Wherein each of the first and second optical path signals is 50% of the optical signals coupled by the coupler, respectively.

The optical delay line 160 may delay the second optical signal being polarization-controlled from the second polarization controller 150 by a predetermined time. A delay time of the optical delay line 160 may be controlled/decided such that a phase value of a detected optical current has a constant regardless of a terahertz frequency.

The terahertz trasnsmitter 170 may receive the first optical path signal being polarization-controlled from the first polarization controller 140, and may generate a terahertz continuous wave using the first optical path signal and an applied bias. That is, the terahertz trasnsmitter 170 may generate a terahertz continuous wave cw THz.

The terahertz receiver 180 may receive the terahertz continuous wave output from the terahertz trasnsmitter 170, and may generate an optical current ITHz using the input terahertz continuous wave and the second optical path signal delayed. The optical current ITHz may be detected by a lock-in amplifier LIA using a modulation frequency of a bias applied to the terahertz trasnsmitter 170 in a homodyne manner.

The optical current ITHz measured by the lock-in amplifier LIA at a receiving stage of the contactless thickness measuring device 100 may be decided by a terahertz electric field ETHz and correlation between a phase of a terahertz wave and phases of beating frequencies of two lasers as expressed in the following equation 1.

$$I_{THz} \propto E_{THz} \cdot \cos\left(\frac{2\pi f}{c}\Delta L + \varphi\right) \quad [\text{Equation 1}]$$

Herein, $\Delta L = (L_{TX} + L_{THz}) - L_{RX}$, and "c" may indicate the velocity of light. Each of $L_{TX}$ and $L_{RX}$ may indicate a length of an optical path where two laser lights arrives at the terahertz trasnsmitter 170 and the terahertz receiver 180 from the 3 dB coupler 130, and $L_{THz}$ may indicate a length of a terahertz wave path from the terahertz transmitter 170 to the terahertz receiver 180. $\varphi$ may indicate a phase offset of a cosine function, and it is frequency-independent.

Referring to the equation 1, if a sum of a transmission optical path and a terahertz wave path is equal to a reception optical path, a phase of a terahertz optical current value measured may be a constant regardless of a frequency.

The following equation 2 may indicate a terahertz wave optical current $I_{ref}$ at a free space as a reference and a terahertz optical current $I_{sam}$ measured when a measurement sample exists.

$$I_{fef} \propto E_{THz} \cdot \cos\left(\frac{2\pi f}{c}\Delta L_{ref} + \varphi\right) \quad [\text{Equation 2}]$$
$$I_{sam} \propto E_{THz} \cdot \cos\left(\frac{2\pi f}{c}\Delta L_{sam} + \varphi\right)$$

Herein, $\Delta L_{ref} = (L_{Tx} + L_{THz\_ref}) - L_{RHz\_ref}$, $\Delta L_{sam} = (L_{Tx} + L_{THz\_sam}) - L_{Rx\_sam}$, and $L_{THz\_sam} = L_{THz\_ref} + (n-1)d$. n may indicate a group refractive index. If a frequency range is limited to be narrow, the group refractive index n may become approximate to the same value as a general refractive index.

The optical path lengths for the receiver that yield constant THz photocurrents in the measured beat frequency band are in the following equation 3.

$$0 = (L_{Tx} + L_{THz\_ref}) - L_{Rx\_ref0}$$
$$0 = (L_{Tx} + L_{THz\_sam}) - L_{Rx\_sam0} \quad [\text{Equation 3}]$$

where LRx_ref0 and LRx_sam0 are the optical path lengths for the reference and the sample, respectively, when the THz photocurrents are constant in the measured frequency band. For the reference data, the THz photocurrents could be measured through air without any sample in the frequency band. The refractive index of a sample is the same as its group refractive index if the measured frequency band is narrow enough for the sample not to be dispersive. Therefore, the relationship between the THz path lengths for the reference and the sample is in the following equation 4.

$$L_{THz\_sam} = L_{THz\_ref} + (n-1) \cdot d \quad [\text{Equation 4}]$$

where d and n are the sample's thickness and refractive index, respectively. The thickness of a sample can be calculated by using Eqs. (3) and (4). In this thickness measurement method, there is no modulo $2\pi$ ambiguity, which can be a problem in methods that use exact frequency scanning at fixed optical path lengths. Moreover, this method does not require precise control of the beat frequency; only accurate scanning of a simple optical delay line is needed.

As expressed by the equation 2, a value of (n−1)d may be calculated using values of $L_{RHZ\_ref}$ and $I_{Rx\_sam}$ by which values of $I_{ref}$ and $I_{sam}$ go to a constant. Thus, a thickness d of a sample may be expressed by the following equation 5.

$$d = \frac{1}{n-1}(L_{Rx\_sam0} - L_{Rx\_ref0}) \quad [\text{Equation 5}]$$

Herein, $L_{Rx\_sam0}$ and $L_{Rx\_ref0}$ may indicate lengths of an optical path of a receiving state where phases of an optical current when a sample 101 exists and when the sample 101 does not exist become a constant regardless of a frequency.

The following equation 6 may indicate a difference between $L_{RHz\_ref0}$ and $L_{Rx\_sam0}$.

$$L_{Rx\_sam0} - L_{RHz\_ref0} = c(T_{RXsam0} - T_{RXref0}) \quad [\text{Equation 6}]$$

Herein, c may indicate the velocity of light. $T_{RXsam0}$ and $T_{RXref0}$ may indicate delay times of an optical delay line 160 by which optical current value measured when a sample exists and when the sample does not exist go to a constant regardless of a frequency. Thus, a thickness of a sample may be measured using delay times of an optical delay line 160 by which phase values of an optical current value measured when a sample exists and when the sample does not exist go to a constant regardless of a frequency.

In FIG. 1, the contactless thickness measuring apparatus 100 uses single polarization mode fibers for transferring the first and second optical path signals from the optical coupler 130 by polarization controllers 140 and 150. However, the presence invention is not limited to the fibers disclosed herein. The contactless thickness measuring apparatus comprises a first polarization maintained fiber to transfer the first optical path signal from the optical coupler to the terahertz transmitter; and a second polarization maintained fiber to transfer the second optical path signal from the optical coupler to the terahertz receiver.

FIGS. 2 to 16 are diagrams illustrating embodiments of the inventive concept.

Below, for ease of description, it is assumed that a refractive index n of a sample 101 is identical at a measurement frequency band.

Figure 2:
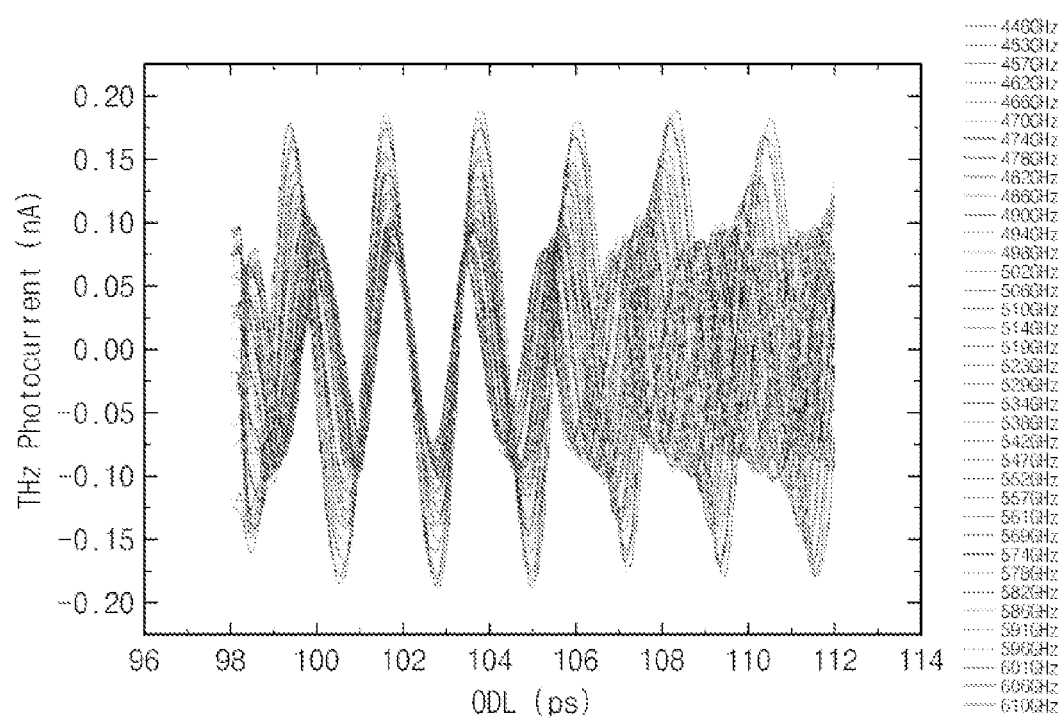
FIG. 2 is a diagram illustrating a terahertz optical current value according to an optical delay time and terahertz operating frequencies on a free space being a reference at thickness measurement.
Figure 3:
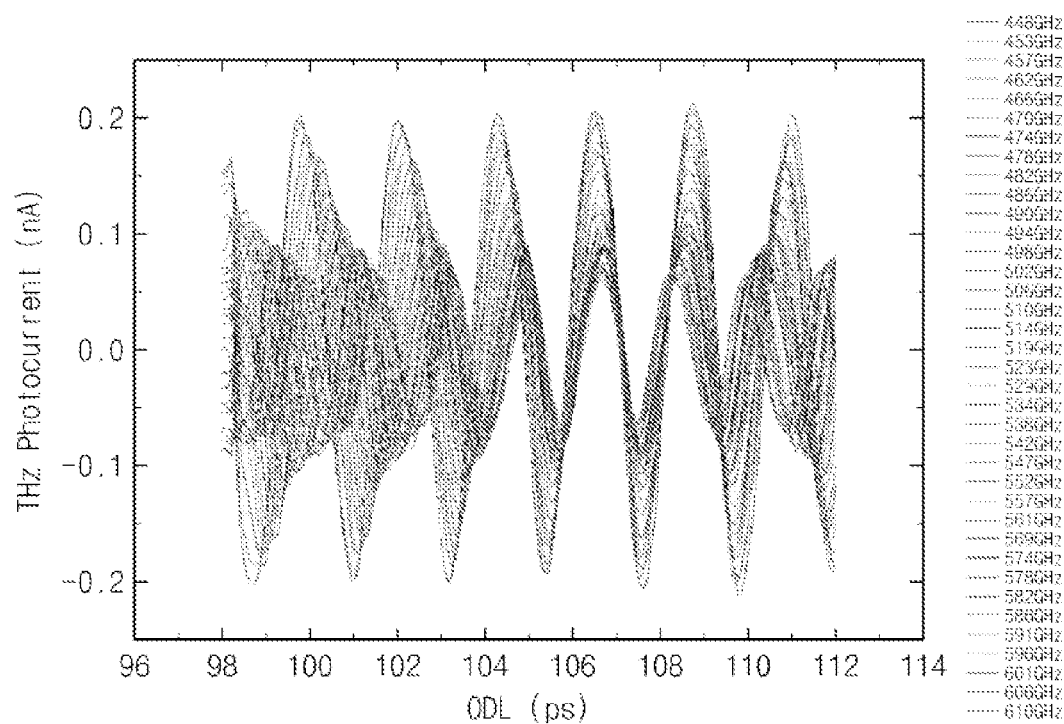
FIG. 3 is a diagram illustrating a terahertz optical current value according to an optical delay time and terahertz operating frequencies when a thickness measurement sample (PE: polyethylene) exists.

FIGS. 2 to 3 are diagrams illustrating terahertz optical current values according to a terahertz operating frequency on a free space being a reference for thickness measurement and an optical delay time and current values when a sample for thickness measurement exists. Referring to FIGS. 2 to 3, as a frequency becomes high an output of a terahertz wave being transmitted and received may be reduced. A phase value of an optical current measured at a specific optical delay time may become approximate to a constant regardless of a frequency.

Figure 4:
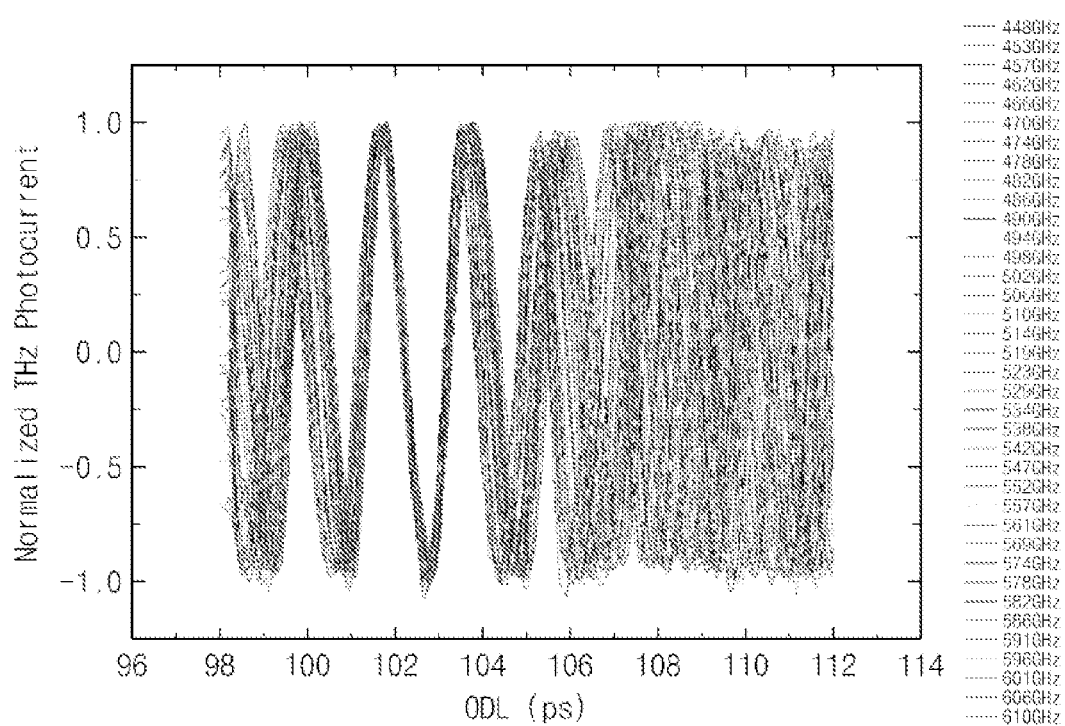
FIG. 4 is a diagram illustrating a positive normalized maximum value on a terahertz optical current value according to an optical delay time and terahertz operating frequencies on a free space being a reference at thickness measurement.
Figure 5:
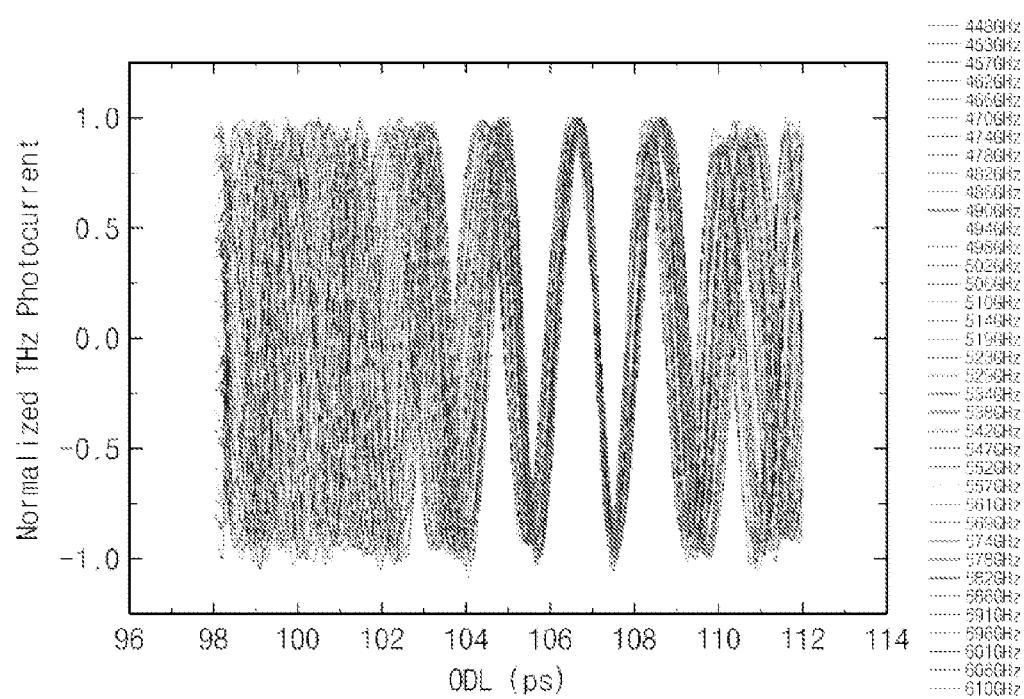
FIG. 5 is a diagram illustrating a positive normalized maximum value on a terahertz optical current value according to an optical delay time and terahertz operating frequencies when a thickness measurement sample (PE: polyethylene) exists.

FIGS. 4 and 5 are diagrams illustrating values obtained by normalizing values in FIGS. 2 and 3 to a positive maximum value to remove a variation in an output of a terahertz wave according to a variation in a frequency.

Referring to FIGS. 2 to 5, in a terahertz optical current value measured at a free space being a reference for thickness measurement, an optical delay time when a phase value is identical between 101.75 ps and 102.75 ps may exist, and in the case that a sample exists, an optical delay time when a phase value is identical between 106.65 ps and 107.55 ps may exist.

Figure 6:
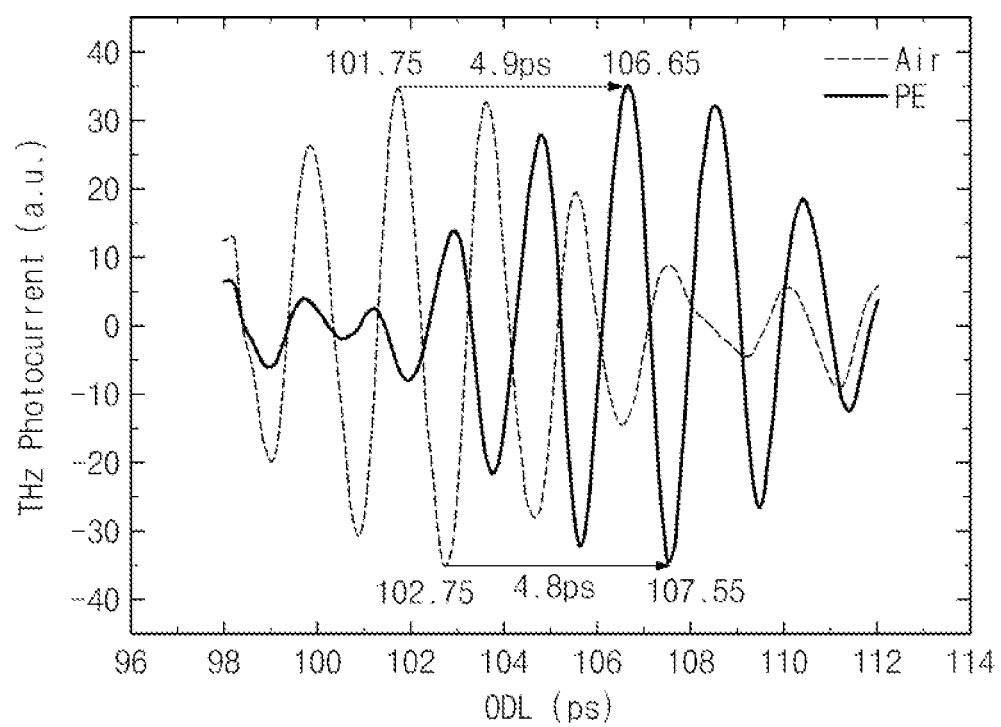
FIG. 6 is a diagram illustrating values obtained by adding normalized reference signals of FIG. 4 and signals penetrating a sample of FIG. 5.

FIG. 6 is a diagram illustrating a sum of normalized values when a sample exists and when a sample does not exist. Referring to FIG. 6, an optical delay time when a phase value of a measured terahertz optical current identical may exist between a maximum value and a minimum value of a sum value.

To simplify calculation for thickness measurement, it is assumed that since φ is a constant regardless of a frequency an optical delay time when a phase value of a terahertz optical current is identical is a maximum value of a sum of normalized signals of currents measured every frequency. With this assumption, when $t_{RXsam0}$ is 106.65 ps and $t_{RXref0}$ is 101.75 ps and a refractive index n of a PE sample measured is 1.46, a thickness d of the PE sample may be about 3.19 mm. Herein, an actual thickness d may be the same value as that measured by vernier calipers.

A thickness measured using an optical delay time when a phase value of a terahertz optical current is identical may vary according to a setting value of a refractive index of a sample.

In example embodiments, a value may be calculated using 38 frequency components from 448 GHz to 610 GHz. For simple measurement, a thickness d may be calculated by measuring three frequency components.

Figure 7:
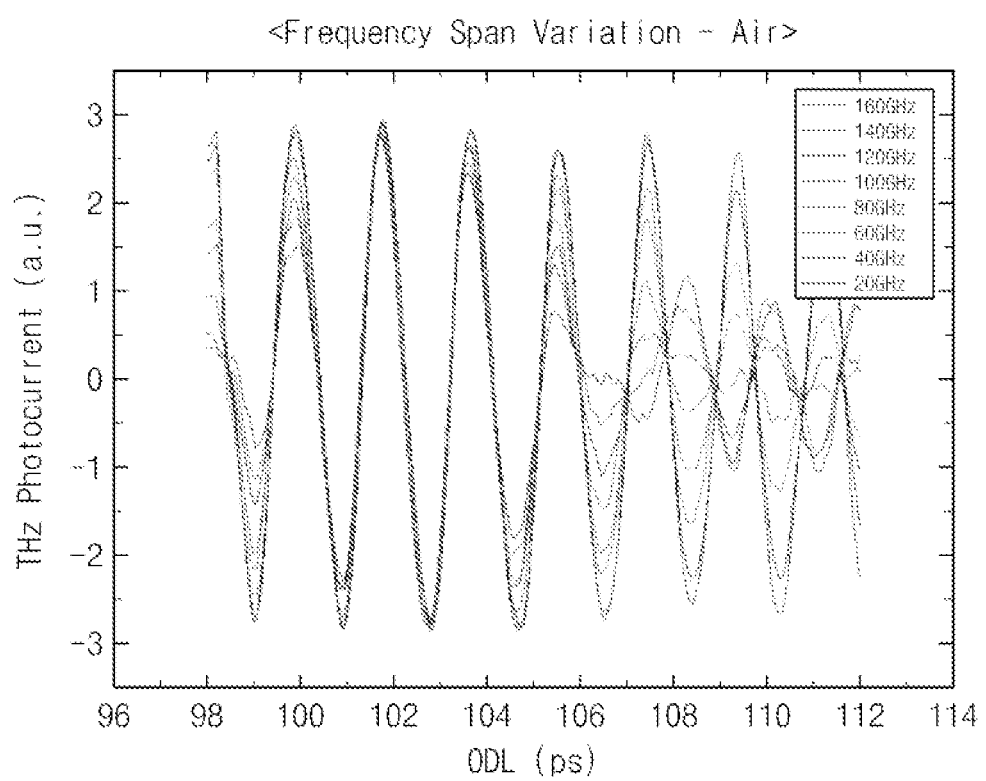
FIG. 7 is a diagram illustrating a sum of normalized terahertz optical current variation values according to an optical delay time measured at three terahertz operating frequencies on a free space being a reference at thickness measurement.
Figure 8:
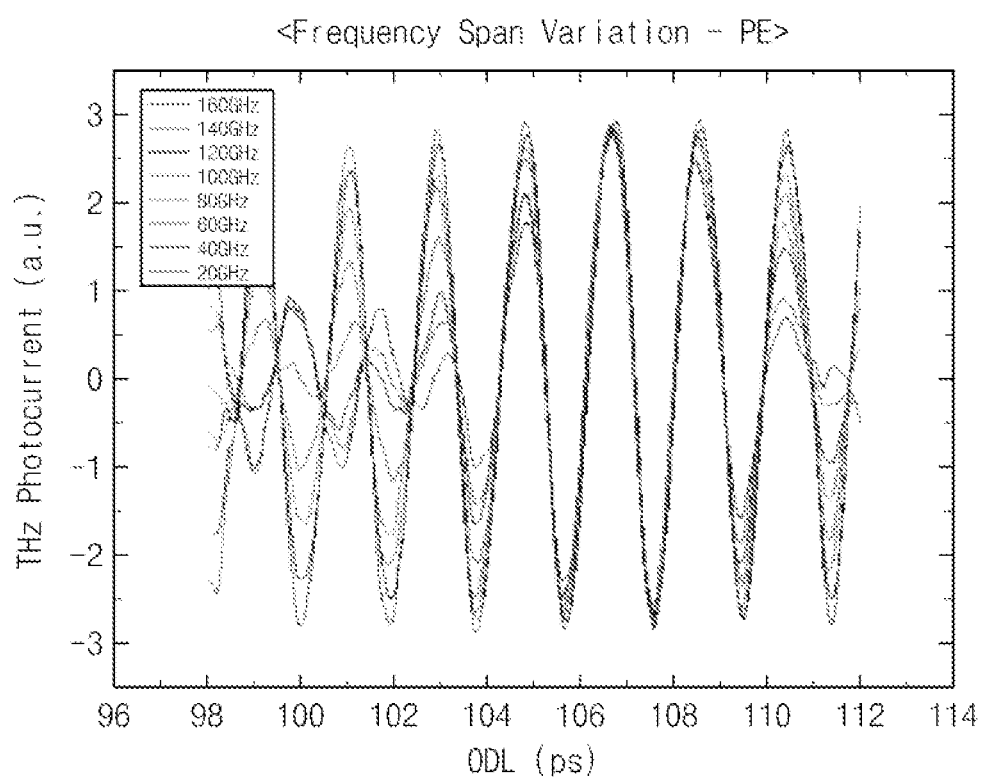
FIG. 8 is a diagram illustrating a sum of normalized terahertz optical current variation values according to an optical delay time measured at three terahertz operating frequencies when a thickness measurement sample (PE: polyethylene) exists.

FIGS. 7 and 8 are diagrams illustrating a sum of normalized terahertz optical current variation values according to an optical delay time measured at three terahertz operating frequencies at a free space as a reference for thickness measurement. Center frequencies of all operating frequencies in FIGS. 7 and 8 may be 523 GHz, and a range of operating frequencies may indicate a difference between a minimum frequency and a maximum frequency.

Figure 9:
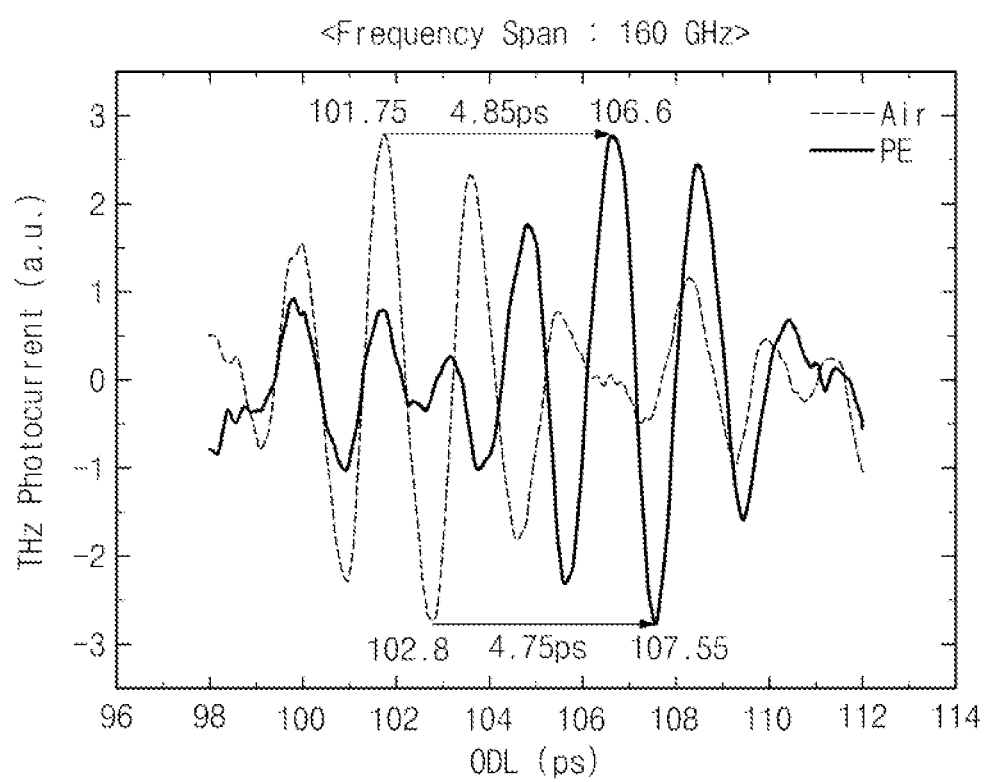
FIG. 9 is a diagram illustrating values obtained by adding three normalized reference signals and signals passing through a sample when a range of three terahertz operating frequencies is 160 GHz.
Figure 10:
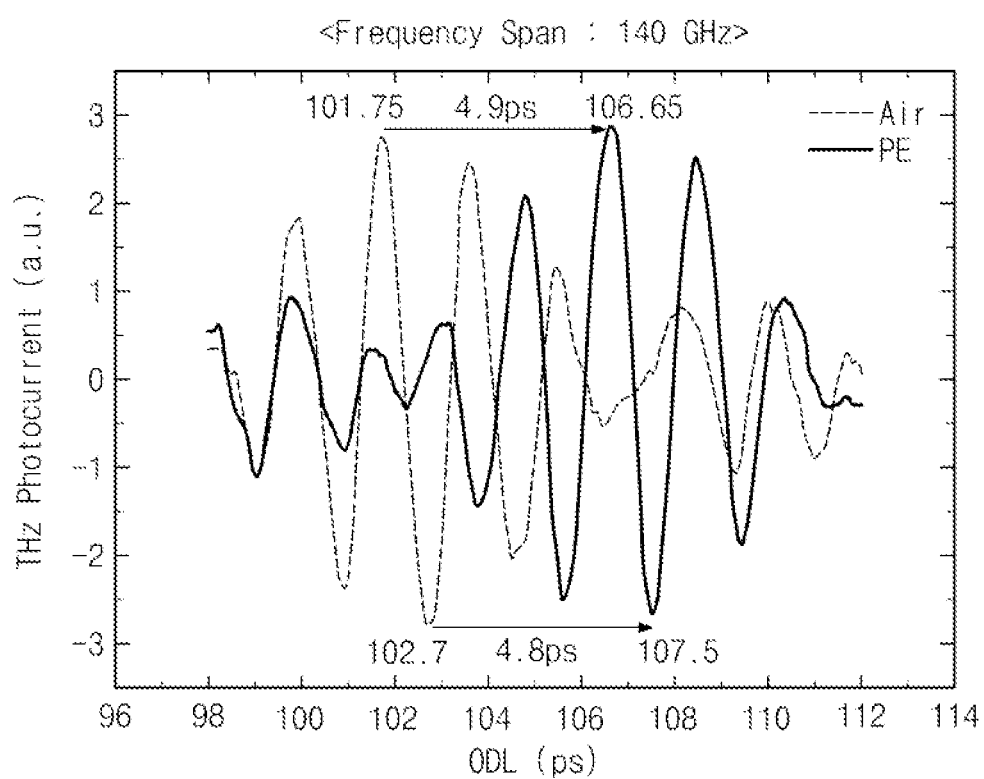
FIG. 10 is a diagram illustrating values obtained by adding three normalized reference signals and signals passing through a sample when a range of three terahertz operating frequencies is 140 GHz.
Figure 11:
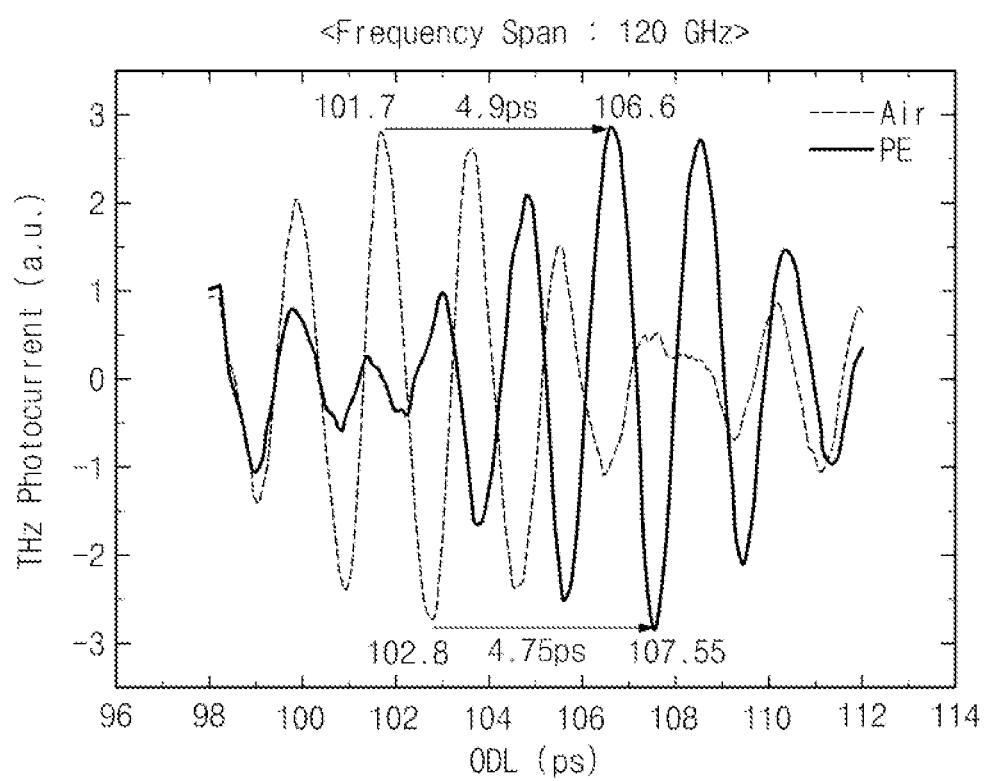
FIG. 11 is a diagram illustrating values obtained by adding three normalized reference signals and signals passing through a sample when a range of three terahertz operating frequencies is 120 GHz.
Figure 12:
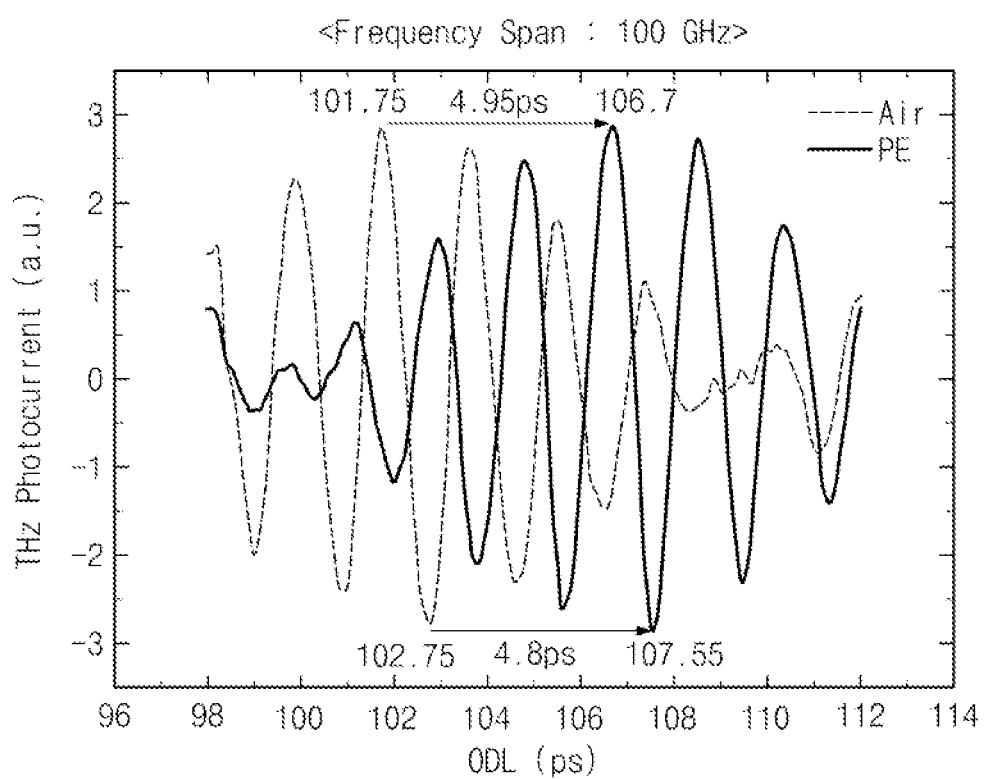
FIG. 12 is a diagram illustrating values obtained by adding three normalized reference signals and signals passing through a sample when a range of three terahertz operating frequencies is 100 GHz.
Figure 13:
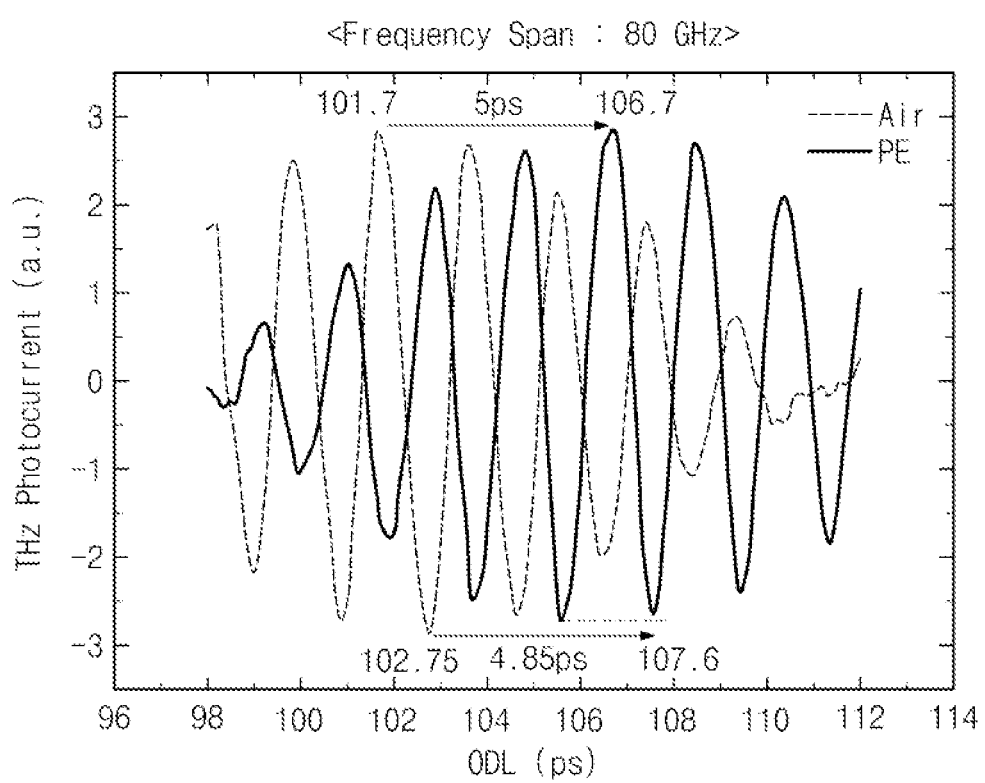
FIG. 13 is a diagram illustrating values obtained by adding three normalized reference signals and signals passing through a sample when a range of three terahertz operating frequencies is 80 GHz.
Figure 14:
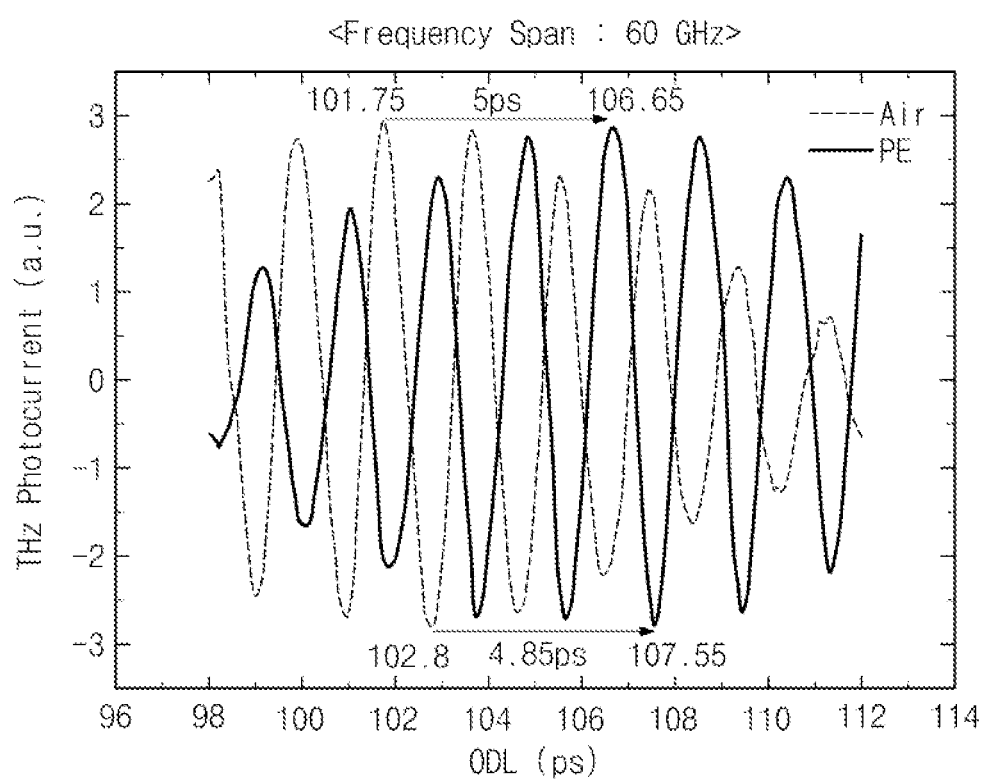
FIG. 14 is a diagram illustrating values obtained by adding three normalized reference signals and signals passing through a sample when a range of three terahertz operating frequencies is 60 GHz.
Figure 15:
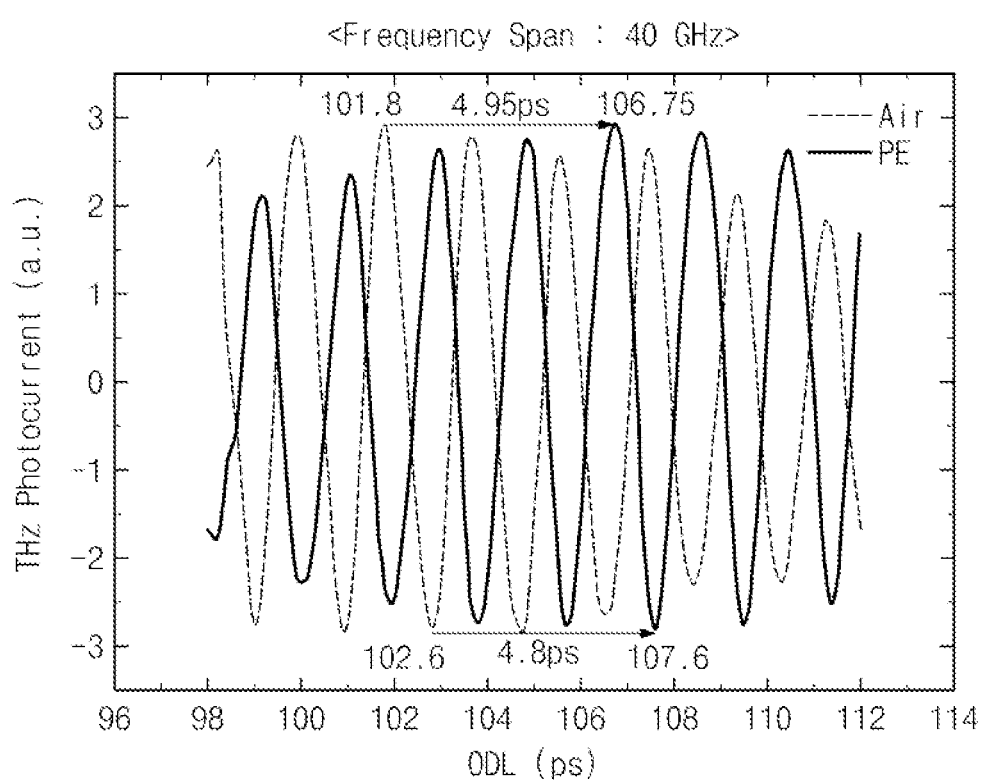
FIG. 15 is a diagram illustrating values obtained by adding three normalized reference signals and signals passing through a sample when a range of three terahertz operating frequencies is 40 GHz.
Figure 16:
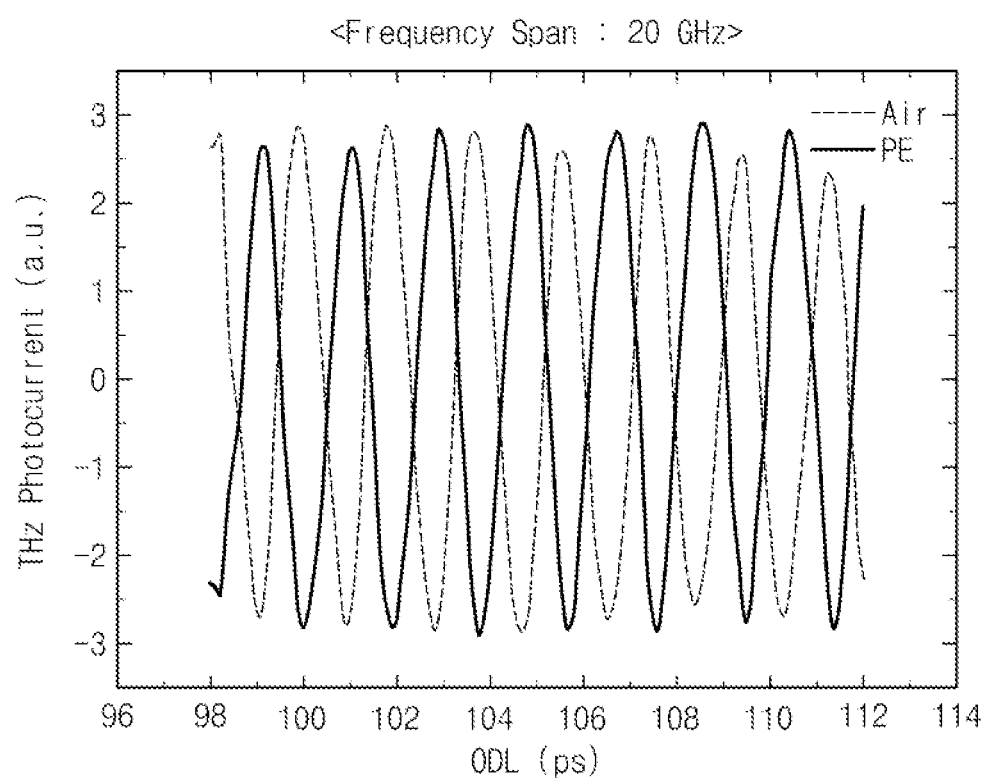
FIG. 16 is a diagram illustrating values obtained by adding three normalized reference signals and signals passing through a sample when a range of three terahertz operating frequencies is 20 GHz.

FIGS. 9 and 16 are diagrams illustrating a sum of normalized terahertz optical current variation values measured at three operating frequencies. Referring to FIGS. 7 and 8 and FIGS. 9 to 16, by three operating frequencies, there may be obtained an optical delay time similar to a delay time of an optical delay line when a terahertz optical current value assured by 38 operating frequencies becomes a constant regardless of a frequency.

Returning to FIGS. 7 and 8 and FIGS. 9 to 16, there may be reduced a difference between a peak having a maximum value of a sum of signals of optical currents measured when a range of three operating frequencies is lowered to 20 GHz from 160 GHz and a peak having a second value. Since an operating frequency range enabling this difference to be distinguished is over 40 GHz, a thickness d of a sample may be measured when a range of three operating frequencies has any frequency over 40 GHz.

To sum it up, as a terahertz continuous wave system is implemented by a homodyne manner, it is possible to implement a simple and low-priced thickness measuring apparatus through simple control of an optical delay line without needing precise control and measurement of two laser wavelengths used to generate a beating signal.

A measurement method of a thickness measuring apparatus according to an embodiment of the inventive concept may measure a thickness of a sample by using a location of an optical delay line where a terahertz optical current value becomes a constant regardless of a terahertz operating frequency using a homodyne measurement principle.

A terahertz continuous wave homodyne system may measure a thickness of a sample using a location of an optical delay line where a terahertz optical current value becomes a constant regardless of a frequency. The terahertz continuous wave homodyne system may be a transmission type or a reflection type.

In a terahertz apparatus and a method according to an embodiment of the inventive concept, there may be used a dual mode laser (DML) to generate optical signals having two different wavelengths at one resonator using a beating signal needed to generate a terahertz continuous wave. In example embodiments, a beating signal needed to generate a terahertz continuous wave may use two different lasers.

In a terahertz apparatus and a method according to another embodiment of the inventive concept, there may be used two lasers to generate optical signals having different wavelengths.

A terahertz continuous wave generating system according to an embodiment of the inventive concept may include a light wave domain at a superlight frequency band, not limited to a terahertz frequency band. In example embodiments, a sample thickness may be measured using two or more frequencies generating a terahertz continuous wave.

A contactless thickness measuring apparatus and a thickness measuring method according to an embodiment of the inventive concept may measure a thickness of a sample simply and for low price by using a location of an optical delay line where a terahertz optical current value becomes a constant regardless of a terahertz operating frequency using a homodyne measurement principle.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A contactless thickness measuring apparatus, comprising:
   a laser generating element configured to generate a first laser light having a first frequency and a second laser light having a second frequency different from the first frequency;
   a coupler configured to couple the first and second laser lights and to output first and second optical path signals;
   a terahertz transmitter configured to receive the first optical path signal from the coupler and to generate a terahertz continuous wave using the first optical path signal and an applied bias;
   an optical delay line configured to delay the second optical path signal output from the coupler; and
   a terahertz receiver configured to receive the terahertz continuous wave penetrating a sample and to detect an optical current using the terahertz continuous wave and a delayed second optical path signal received from the optical delay line,
   wherein a thickness of the sample is a value corresponding to the optical current, and
   wherein the optical delay line is controlled such that a phase value of the optical current is the same regardless of a frequency of the terahertz continuous wave.

2. The contactless thickness measuring apparatus of claim 1, wherein the laser generating element comprises:
   a first laser configured to generate the first laser light; and
   a second laser configured to generate the second laser light.

3. The contactless thickness measuring apparatus of claim 1, wherein the first and second optical path signals are 50% of the first and second laser lights coupled by the optical coupler, respectively.

4. The contactless thickness measuring apparatus of claim 1, wherein the laser generating element is a dual mode laser having one cavity to generate the first and second laser lights.

5. The contactless thickness measuring apparatus of claim 1, further comprising:
   an optical amplifier placed between the laser generating element and the coupler to amplify the first and second laser lights.

6. The contactless thickness measuring apparatus of claim 1, further comprising:
   a first polarization controller configured to control polarization of the first optical path signal between the coupler and the terahertz transmitter; and
   a second polarization controller configured to control polarization of the second optical path signal between the coupler and the optical delay line.

7. The contactless thickness measuring apparatus of claim 1, further comprising:
   a first polarization maintained fiber to transfer the first optical path signal from the optical coupler to the terahertz transmitter; and
   a second polarization maintained fiber to transfer the second optical path signal from the optical coupler to the terahertz receiver.

8. The contactless thickness measuring apparatus of claim 1, wherein a thickness of the sample is measured by controlling the optical delay line without precise control and measurement of the first and second frequencies.

9. A thickness measuring method of a contactless thickness measuring apparatus, comprising:
   coupling beating signals having different frequencies;
   generating a terahertz continuous wave using the coupled beating signal and an applied bias;
   applying the terahertz continuous wave to at least one sample;
   receiving a terahertz continuous wave passing through the at least one sample;
   detecting an optical current by a homodyne manner using the received terahertz continuous wave;
   controlling the optical delay line to determine a first delay time for which a phase value of the detected optical current is the same regardless of a plurality of measurement frequencies; and
   determining a thickness of the at least one sample using the first delay time.

10. The thickness measuring method of claim 9, wherein the beating signals are generated by one dual mode laser.

11. The thickness measuring method of claim 9, wherein the beating signals are generated by two different lasers.

12. The thickness measuring method of claim 9, wherein the beating signals are generated using at least two beating frequencies.

13. The thickness measuring method of claim 9, wherein a thickness of the sample is measured by controlling the optical delay line without precise control and measurement of frequencies of the beating signals.

14. The thickness measuring method of claim 9, wherein a frequency of the terahertz continuous wave has a value between a superlight frequency band and a light wave band.

15. The thickness measuring method of claim 9, further comprising:
   generating a second terahertz wave;
   transmitting the second terahertz wave through a free space; and
   determining a second delay time for which a phase value of optical current detected from the second terahertz wave is the same regardless of a plurality of measurement frequencies.

16. The method of claim 15, further comprising:
   comparing the first delay time to the second delay time to determine the thickness of the sample.

* * * * *